US010185199B2

(12) United States Patent
Branda et al.

(10) Patent No.: US 10,185,199 B2
(45) Date of Patent: Jan. 22, 2019

(54) SYSTEM AND METHOD FOR CONTROLLING AN OPTICAL FILTER ASSEMBLY

(71) Applicant: SWITCH MATERIALS, INC., Burnaby (CA)

(72) Inventors: Neil Robin Branda, Burnaby (CA); Glen Ramsay Bremner, Burnaby (CA); Jeremy Graham Finden, Burnaby (CA); Corbin Abe Giesbrecht, Burnaby (CA); Duhane Lam, Burnaby (CA); Matt Andrew Pilapil, Burnaby (CA); Matthew Paul Smit, Burnaby (CA)

(73) Assignee: SWITCH MATERIALS, INC., Burnaby, British Columbia (CA)

( * ) Notice: Subject to any disclaimer, the term of this patent is extended or adjusted under 35 U.S.C. 154(b) by 0 days.

(21) Appl. No.: 15/416,965

(22) Filed: Jan. 26, 2017

(65) Prior Publication Data
US 2017/0205682 A1 Jul. 20, 2017

Related U.S. Application Data

(63) Continuation of application No. 14/395,381, filed as application No. PCT/CA2013/000381 on Apr. 18, 2013, now Pat. No. 9,594,285.
(Continued)

(51) Int. Cl.
*G02F 1/03* (2006.01)
*G02F 1/07* (2006.01)
(Continued)

(52) U.S. Cl.
CPC ............... *G02F 1/163* (2013.01); *E06B 9/24* (2013.01); *G02B 5/23* (2013.01); *G02F 1/13318* (2013.01); *E06B 2009/2464* (2013.01)

(58) Field of Classification Search
CPC .............. G02F 1/163; G02F 2201/58; E06B 2009/2464; E06B 2009/2476
(Continued)

(56) References Cited

U.S. PATENT DOCUMENTS 5,355,245 A 10/1994 Lynam
5,463,491 A 10/1995 Check, III
(Continued)

FOREIGN PATENT DOCUMENTS

CN 101142520 A 3/2008
JP 57-167009 A 10/1982
(Continued)

OTHER PUBLICATIONS

Office Action from corresponding Chinese Patent Application No. 201380031888.9, dated Dec. 1, 2016.
(Continued)

*Primary Examiner* — Mahidere Sahle
(74) *Attorney, Agent, or Firm* — Merchant & Gould P.C.

(57) ABSTRACT

A control system for a variable transmittance optical filter assembly includes a controller in communicatively coupled to a pair of load terminals, and a memory communicatively coupled to the controller and having encoded thereon statements and instructions executable by the controller to transition the optical filter assembly between operating states when coupled to the pair of load terminals. The controller is operable to perform any one or more of: allowing the optical filter assembly to transition to a dark state by shorting the load terminals together, maintaining the optical filter assembly in a hold mode by applying a pulse width modulated voltage signal across the load terminals, and transitioning the optical filter assembly between operative states by applying a voltage signal having voltage pulses of opposite polarities to the load terminals.

10 Claims, 18 Drawing Sheets

Related U.S. Application Data

(60) Provisional application No. 61/625,855, filed on Apr. 18, 2012, provisional application No. 61/661,690, filed on Jun. 19, 2012.

(51) Int. Cl.
    *G02F 1/163*   (2006.01)
    *E06B 9/24*    (2006.01)
    *G02B 5/23*    (2006.01)
    *G02F 1/133*   (2006.01)

(58) Field of Classification Search
     USPC ................................................ 359/238–297
     See application file for complete search history.

(56) References Cited

U.S. PATENT DOCUMENTS

| | | | |
|---|---|---|---|
| 5,604,626 | A | 2/1997 | Teowee et al. |
| 5,838,483 | A | 11/1998 | Teowee et al. |
| 6,055,089 | A | 4/2000 | Schulz et al. |
| 6,065,836 | A | 5/2000 | Krishnan et al. |
| 6,084,700 | A | 7/2000 | Knapp et al. |
| 6,084,702 | A | 7/2000 | Byker et al. |
| 6,246,505 | B1 | 6/2001 | Teowee et al. |
| 6,910,729 | B2 | 6/2005 | Kraenzler et al. |
| 6,934,067 | B2 | 8/2005 | Ash et al. |
| 7,300,167 | B2 | 11/2007 | Fernando et al. |
| 7,459,189 | B2 | 12/2008 | Tahara et al. |
| 2004/0001056 | A1 | 1/2004 | Atherton et al. |
| 2005/0046920 | A1 | 3/2005 | Freeman et al. |
| 2006/0209007 | A1 | 9/2006 | Pyo et al. |
| 2007/0220427 | A1 | 9/2007 | Briancon et al. |
| 2008/0239452 | A1 | 10/2008 | Xu et al. |
| 2009/0002802 | A1 | 1/2009 | Shibuya et al. |
| 2009/0213282 | A1 | 8/2009 | Burlingame et al. |
| 2010/0283957 | A1 | 11/2010 | Matera et al. |
| 2010/0315693 | A1 | 12/2010 | Lam et al. |
| 2012/0239209 | A1* | 9/2012 | Brown ............... H04L 12/2803 700/278 |

FOREIGN PATENT DOCUMENTS

| | | |
|---|---|---|
| JP | 08-160471 A | 6/1996 |
| WO | 2004/015024 A1 | 2/2004 |
| WO | 2010/142019 A1 | 12/2010 |
| WO | 2012/125332 A2 | 9/2012 |

OTHER PUBLICATIONS

Zhang et al. "An UV photochromic memory effect in proton-based WO3 electrochromic devices", Applied Physics Letters, vol. 93, No. 20, 2008, 203508-1-203508-2.

Extended European Search Report from European Patent Application No. 13778526.7, dated Dec. 22, 2015.

Gorodetsky, "The design of dual-mode photochromic and electrochromic 1,2-dithienylcyclopentene dyes", PhD dissertation, Simon Fraser University (Canada), 2008, Chapters 1 & 5, Section 4.4.

International Preliminary Report on Patentability for International Application No. PCT/CA2010/000849 dated Dec. 12, 2011.

International Search Report and Written Opinion from International Application No. PCT/CA2013/000381 dated Aug. 1, 2013.

International Search Report for International Application No. PCT/CA2010/000849 dated Oct. 27, 2010.

Office Action from Chinese Patent Application No. 201080035776.7, dated Mar. 26, 2014.

Brian Gorodetsky "The design of dual-mode photochromic and electrochromic 1,2-dithienylcyclopentene dyes", PhD dissertation, Simon Fraser University (Canada), 2008, Chapters 1 & 5, Section 4.4.

Written Opinion of International Searching Authority for International Application No. PCT/CA2010/000849 dated Oct. 27, 2010.

Zhang et al., "An UV photochromic memory effect in proton-based WO3 electrochromic devices", Applied Physics Letters, vol. 93, No. 20, 2008, 203508-1-203508-2.

Office Action from corresponding Chinese Patent Application No. 201380031888.9, dated Jul. 21, 2017.

\* cited by examiner

SYSTEM AND METHOD FOR CONTROLLING AN OPTICAL FILTER ASSEMBLY

This application is a Continuation Application of U.S. application Ser. No. 14/395,381, filed 17 Oct. 2014, which is a National Stage Application of PCT/CA2013/000381, filed 18 Apr. 2013, which claims benefit of U.S. Provisional Ser. No. 61/661,690, filed 19 Jun. 2012, and which claims benefit of U.S. Provisional Ser. No. 61/625,855, filed 18 Apr. 2012, and which applications are incorporated herein by reference. To the extent appropriate, a claim of priority is made to each of the above disclosed applications.

TECHNICAL FIELD

The present disclosure is directed towards a system and method for controlling an optical filter assembly.

BACKGROUND

Variable transmittance optical filters are devices that can be used to selectively filter electromagnetic radiation. Given this ability these filters can be incorporated into a room's windows to control one or both of the intensity and frequency of the electromagnetic radiation that enters and escapes the room. The comfort of people in the room and the energy efficiency of the room can depend on how much and what kind of electromagnetic radiation the windows allow into and out of the room. Accordingly, research and development continue into methods and systems that can be used to control variable transmittance optical filters.

SUMMARY

According to an aspect, there is provided a control system for a variable transmittance optical filter assembly, the optical filter assembly comprising a pair of terminals and an optical filter electrically coupled between the pair of terminals. The control system comprises: (a) a controller communicatively coupled to a pair of load terminals for electrically coupling to the terminals of the optical filter assembly; and (b) a memory communicatively coupled to the controller and having encoded thereon statements and instructions executable by the controller to transition the optical filter assembly between operating states, wherein the controller allows the optical filter assembly to transition to a dark state by shorting the load terminals together, and wherein the transmittance of the optical filter assembly decreases to a minimum transmittance in response to light striking the optical filter and increases to a maximum transmittance in response to a voltage being applied across the terminals of the optical filter assembly.

According to another aspect, there is provided a control system for a variable transmittance optical filter assembly, the optical filter assembly comprising a pair of terminals and an optical filter electrically coupled between the pair of terminals. The control system comprising: (a) a controller communicatively coupled to a pair of load terminals for electrically coupling to the terminals of the optical filter assembly; and (b) a memory communicatively coupled to the controller and having encoded thereon statements and instructions executable by the controller to transition the optical filter assembly between operating states, wherein the controller maintains the optical filter assembly in a hold mode by applying a pulse width modulated voltage signal across the load terminals, and wherein the transmittance of the optical filter assembly is held at a certain average value and variance in the hold mode.

According to another aspect, there is provided a control system for a variable transmittance optical filter assembly, the optical filter assembly comprising a pair of terminals and an optical filter electrically coupled between the pair of terminals. The control system comprising: (a) a controller in communicatively coupled to a pair of load terminals for electrically coupling to the terminals of the optical filter assembly; and (b) a memory communicatively coupled to the controller and having encoded thereon statements and instructions executable by the controller to transition the optical filter assembly between operating states, wherein the controller transitions the optical filter assembly from a first operating state to a second operating state by applying a voltage signal comprising a plurality of pulses across the load terminals, wherein at least one of the pulses comprises a voltage of one polarity, and at least another of the pulses comprises a voltage of an opposite polarity.

According to another aspect, there is provided an optical filtering system comprising: (a) at least an input voltage terminal to which an input voltage can be applied; (b) an optical filter assembly comprising a pair of terminals and an optical filter electrically coupled between the pair of terminals, wherein the transmittance of the optical filter assembly decreases to a minimum transmittance in response to light striking the optical filter and increases to a maximum transmittance in response to a voltage applied across the terminals of the optical filter assembly; (c) a pair of load terminals to which the terminals of the optical filter assembly are electrically coupled; and (d) switching circuitry for switching the optical filter assembly between a faded state and a dark state, wherein the switching circuitry applies at least a portion of the input voltage across the load terminals to switch the assembly to the faded state, and the switching circuitry shorts the load terminals together to switch the assembly to the dark state.

According to another aspect, there is provided an optical filtering system comprising: (a) at least an input voltage terminal to which an input voltage can be applied; (b) an optical filter assembly comprising a pair of terminals and an optical filter electrically coupled between the pair of terminals, wherein the transmittance of the optical filter assembly decreases to a minimum transmittance in response to light striking the optical filter and increases to a maximum transmittance in response to a voltage applied across the terminals of the optical filter assembly; (c) a pair of load terminals to which the terminals of the optical filter assembly are electrically coupled; and (d) switching circuitry switchable to apply at least a portion of the input voltage across the load terminals in one polarity and an opposite polarity.

According to another aspect, there is provided a method for controlling a variable transmittance optical filter assembly comprising a pair of terminals and an optical filter electrically coupled between the terminals. The method comprising: (a) applying a voltage across the terminals of the optical filter assembly sufficient to transition the optical filter assembly to a faded state; and (b) shorting the terminals of the optical filter assembly together to allow the optical filter assembly to transition to a dark state, wherein the transmittance of the optical filter assembly decreases to a minimum transmittance in response to light striking the optical filter and increases to a maximum transmittance in response to a voltage being applied across the terminals of the optical filter assembly.

According to another aspect, there is provided a method for controlling a variable transmittance optical filter assembly comprising a pair of terminals and an optical filter electrically coupled between the terminals. The method comprising maintaining the optical filter assembly in a hold mode by applying a pulse width modulated voltage signal across the terminals, and wherein the transmittance of the optical filter assembly is held at a certain average value and variance in the hold mode.

According to another aspect, there is provided a method for controlling a variable transmittance optical filter assembly comprising a pair of terminals and an optical filter electrically coupled between the terminals. The method comprising transitioning the optical filter assembly from a first operating state to a second operating state by applying a voltage signal comprising a plurality of pulses across the terminals, wherein at least one of the pulses comprises a voltage of one polarity, and at least another of the pulses comprises a voltage of an opposite polarity.

According to another aspect, there is provided a control system for a variable transmittance optical filter assembly, the optical filter assembly comprising a pair of terminals and an optical filter electrically coupled between the pair of terminals. The control system comprising: (a) a controller, (b) switching circuitry communicatively coupled to the controller, the switching circuitry comprising a pair of input voltage terminals for receiving an input voltage, and a pair of load terminals for electrically coupling to the terminals of the optical filter assembly, wherein the controller is configured to: apply a portion of the input voltage across the load terminals in a forward polarity, apply a portion of the input voltage across the load terminals in a reverse polarity, short the load terminals together, or remove voltage from the load terminals, in response to a control signal received from the controller; (c) a memory communicatively coupled to the controller and having encoded thereon statements and instructions executable by the controller to send the control signal to the switching circuitry according to a desired operating state of the optical filter assembly.

In any of the above aspects, the switching circuitry may be at least one member selected from the group consisting of an H-bridge, a single pole double throw switch, and a double pole double throw switch. The control system may further comprise a detector being at least one member of the group consisting of a switch, a clock, a timer, an HVAC system, a building control system, and an automotive control system.

This summary does not necessarily describe the entire scope of all aspects. Other aspects, features and advantages will be apparent to those of ordinary skill in the art upon review of the following description of specific embodiments.

DETAILED DESCRIPTION

An optical filter assembly includes an optical filter that is electrically coupled between a pair of terminals. The optical filter may be fabricated using any one of several different types of technologies. For example, the optical filter may be fabricated using photochromic, electrochromic, hybrid photochromic/electrochromic, liquid crystal, or suspended particle technologies. Photochromic optical filters tend to automatically darken when exposed to sunlight or UV, and lighten in the absence of sunlight or UV. Electrochromic, liquid crystal, and suspended particle technologies however, tend to alternate between dark and light operating states (or transmissive states) in response to electricity. Electrochromic optical filters, for example, tend to darken when a voltage differential is applied across a pair of terminals electrically coupled to different sides of the electrochromic material, and tend to lighten when the polarity of the voltage differential is reversed.

The optical filter assemblies used in the embodiments discussed herein are based on a hybrid photochromic/electrochromic technology, which conversely darken in response to sunlight, UV, or electromagnetic radiation (hereinafter "light") and lighten or become transparent (hereinafter "fade") in response to a non-zero voltage (hereinafter "voltage") applied across the terminals of the optical filter assembly. Hybrid photochromic/electrochromic optical filters comprise switching material having one or more chromophores that are reversibly interconvertible between coloured (dark) and uncoloured (faded) states; the switching material may further comprise a solvent portion, polymer(s), salts, or other components to support the interconversion of the chromophore between coloured and uncoloured states when exposed to light or voltage. Some examples of chromophores may include fulgides, diarylethenes or dithienyl-cyclopentenes. However, in alternative embodiments (not depicted), other types of optical filters comprising alternate switching materials with similar behaviour to Hybrid photochromic/electrochromic switching materials, may also be employed.

Figure 1:
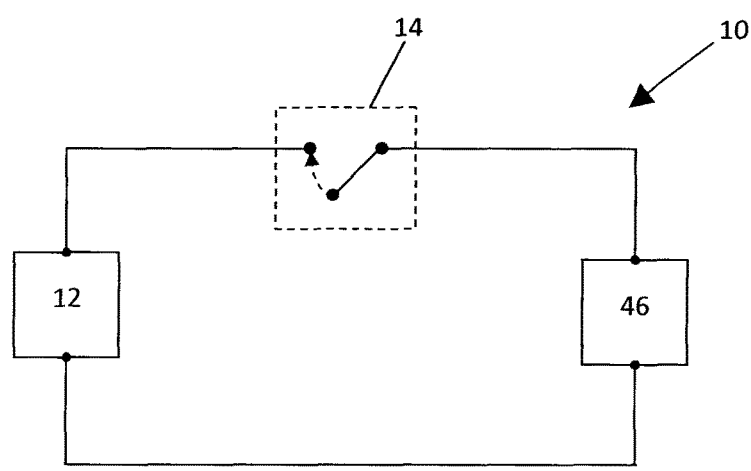
FIG. 1 is a block diagram of a control system for an optical filter assembly.

Referring now to FIG. 1, there is shown a control system 10 that can be used with an optical filter assembly 46 (hereinafter, "assembly 46"). The assembly 46 comprises a switchable photochromic/electrochromic material sandwiched between two transparent conductive electrodes. Examples of transparent conductive electrodes include indium tin oxide (ITO) coated PET and glass, as well as fluorine tin oxide (FTO) coated glass and other transparent conductive substrates. The control system 10 is used to control light transmittance through the assembly 46, and includes a power supply 12 and a manually controlled single pole, single throw (SPST) switch 14 that electrically couples the power supply 12 across the assembly 46 when closed. When the switch 14 is open and light has been shining on the assembly 46 for a period of time, the assembly 46 is dark and is accordingly in the "dark state". When the switch 14 is subsequently closed, and the power supply 12 applies a voltage across the assembly 46, the assembly 46 fades and transitions to the "faded state". When the switch 14 is opened again, and the assembly 46 is exposed to light, the assembly 46 transitions back to the dark state.

One issue encountered when using the control system 10 of FIG. 1 is the accumulation of electrical charge on the assembly 46's terminals when in the faded state. The residual charges result in a lingering electric field between the terminals, which inhibits the assembly 46's transition to the dark state when the switch 14 is subsequently opened. Another issue encountered with the control system 10 of FIG. 1 is that it has limited control of the assembly 46's operative state (e.g. dark, faded, etc.), since it does not consider real-time information such as ambient light levels, or the assembly 46's current transmittance. For example, an assembly 46's transition between faded and dark states may vary according to a number of extrinsic factors, such as the wavelength and intensity of light striking the assembly 46. Where the switching material thermally responsive, temperature may also affect state transitions. Additionally, the control system 10 of FIG. 1 is designed to keep the assembly 46 at either the faded or dark states; it is not designed to hold the assembly 46 at an intermediate state corresponding to a transmittance between the faded and dark states. Finally, the control system 10 of FIG. 1 only applies the power supply 12 voltage across the assembly 46 in a forward polarity; in some instances, it may be helpful to apply voltage in a reverse polarity to help dissipate residual charge.

General Control System Infrastructure

Figure 4:
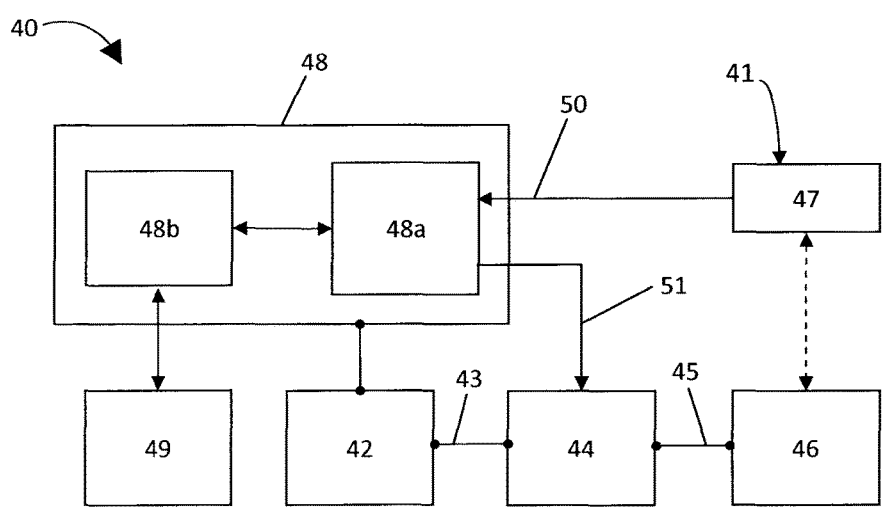
FIG. 4 is a block diagram of a control system for the optical filter assembly, according to another embodiment.

Referring to FIG. 4, there is shown one embodiment of the control system 40 for a variable transmittance assembly 46. The control system 40 comprises a controller 48 electrically coupled to a power supply 42; a memory 49 communicatively coupled to the controller 48 and having encoded statements and instructions executable by the controller 48; switching circuitry 44 controlled by the controller via control input 51, and which is also coupled to the power supply 42 through input voltage terminals 43; and a detector 47 that is communicatively coupled to the controller 48. The detector 47 may comprise for example, a light sensor to detect ambient lighting conditions or a switch to detect user input, but may comprise other types of sensors, switches, timers, or input devices in other embodiments. For example, detector 47 may comprise a pull-up switch, a pull-down switch, a differential switch, an ohmmeter, or an ammeter.

As shown in FIG. 4, the controller 48 comprises a processor 48b for processing the encoded statements and instructions on the memory 49, and an input/output module 48a (hereinafter "I/O module") for receiving a detector output signal 50 from the detector 47, and communicating the signal 50 to the processor 48b, and also for controlling the switching circuitry 44 via control input 51 according to the processed statements and instructions by the processor 48b. The switching circuitry 44 also includes load terminals 45 that can apply a voltage (for example, from the power supply 42 as a source) across the assembly 46's terminals in response to the control input 51 from the I/O module 48a. Switching circuitry 44 may comprise, for example, an H-bridge capable of applying a forward and reverse voltage across load terminals 45, as well as open and -short-circuiting the load terminals 45.

As will be discussed in further detail below, the control system 40 may be used to control and transition the assembly 46 between various operative states, including: transitioning the assembly 46 to a dark state by shorting its terminals together, using a detector 47 to monitor and control the assembly 46's operative state, placing the assembly 46 in a hold mode by applying a pulse width modulated signal, and transitioning the assembly 46 to a faded state by applying voltage signal comprising alternating voltage polarities.

While the present disclosure references operative states of the assembly 46 as simply "dark", "faded", or "intermediate", the optical transmittance or clarity of the assembly 46 in particular states may also vary according to specific embodiments. For example, the 'dark' state in one embodiment may refer to a transmittance of 5%, whereas in another embodiment the 'dark' state may refer to transmittance anywhere in the range of 0% to 15%. In another example, the assembly 46 may be optically clear when in the 'faded' state in one embodiment and only relatively transparent in another embodiment.

The control system 40 of FIG. 4 is operable to apply a portion of the supply voltage received at the input voltage terminals 43 across the load terminals 45 to transition the assembly 46 to a faded state, and is also capable of transitioning the assembly 46 to a dark state by open or short circuiting the load terminals 45, based on feedback received from the detector 47. The detector 47 detects any sensory input 41, and in response produces a detector output signal 50 that is sent to the I/O module 48a of the controller 48. Sensory input 41 may, for example, comprise a button push, an environmental (luminosity) change, a resistance or transmission measurement of the assembly 46, a timer signal, or a clock signal. In an embodiment in which the detector 47 is a switch or button, the sensory input 41 may be a user flipping the switch or pushing the button to indicate that the user wants the assembly 46 to transition to a certain state (e.g. dark or faded state). In an embodiment in which the detector 47 is a light sensor, the sensory input 41 may be a luminosity reading that is high enough that a user would want the assembly 46 to automatically transition from the faded state to the dark state to block the transmission of light. In an embodiment in which the detector 47 is a timer or a clock, the sensory input may be a triggering event, such as the timer indicating that a predetermined period has elapsed, or the clock indicating that the time for transitioning the assembly 46 has been reached. Additionally, the sensory input 41 may comprise triggering events provided by a building automation system that controls an HVAC system and building lights and temperature.

Processor 48b, through the I/O module 48a, receives and processes the detector output signal 50, and controls the switching circuitry 44 via the control input 51 to place the assembly 46 into a desired state. For example, in an embodiment where the detector 47 is a light sensor and the detector output signal 50 is a luminosity reading, the processor 48b may compare the luminosity reading to a maximum luminosity threshold, which if exceeded, means that the luminosity reading is too high and that the assembly 46 should be transitioned to the dark state ("darkened"). Accordingly, the processor 48b through I/O module 48a configures the switching circuitry 44 to open or short circuit the load terminals 45 to darken the assembly 46.

In another embodiment, if the processor 48b determines through detector output signal 50 that the assembly 46 should be in the faded state, the processor 48b, through the use of the I/O module 48a, configures the switching circuitry 44 such that at least a portion of the voltage received from the input voltage terminals 43, sufficient to transition the filter to the faded state (a "threshold voltage"), is applied across its load terminals 45 to thereby fade the assembly 46. For example, in an embodiment where the detector 47 is a light sensor and the detector output signal 50 is a luminosity reading, the processor 48b may compare the luminosity reading to a minimum luminosity threshold; if the luminosity reading is lower than the minimum luminosity threshold, there is insufficient light and the processor 48b will transition the assembly 46 to the faded state. The magnitude of the threshold voltage to fade or transition the assembly 46 varies according to the particular switching material used, and may also be affected by extrinsic factors. In a particular embodiment, the threshold voltage is in the range 0.6-2.5 volts, but may also range from 0.1 to 10V in other embodiments.

In other embodiments (not shown), the processor 48b may apply a voltage signal comprising a plurality of different voltage levels, to transition the assembly 46 to the faded state. For example, the signal may comprise a first pulse at a first voltage level, followed by a second pulse at a second voltage level; the first voltage level may be higher than the second voltage level to more quickly charge the assembly 46's electrodes and establish the required electric field, and shorten the fading time of assembly 46 compared to applying the second pulse alone.

In some instances, it may be desirable to achieve a relatively longer transition time from the faded state to the dark state. In this case, the controller 48 may instead open circuit (i.e. electrically uncouple) the load terminals 45 so that accumulated charge on the assembly 46's terminals may naturally dissipate, allowing for ambient light shining on the assembly 46 to automatically darken it. For example, when the processor 48b determines using the detector output signal 50 that the assembly 46 should be in the dark state, the processor 48b through I/O module 48a may open circuit the load terminals 45 so that it can be automatically darkened through exposure to ambient light. However, if a relatively quicker transition time to the dark state is desired, the processor 48b may instead, through I/O module 48a, short circuit the load terminals 45 to help dissipate any residual charge differential accumulated between the assembly 46's terminals.

Figure 2:
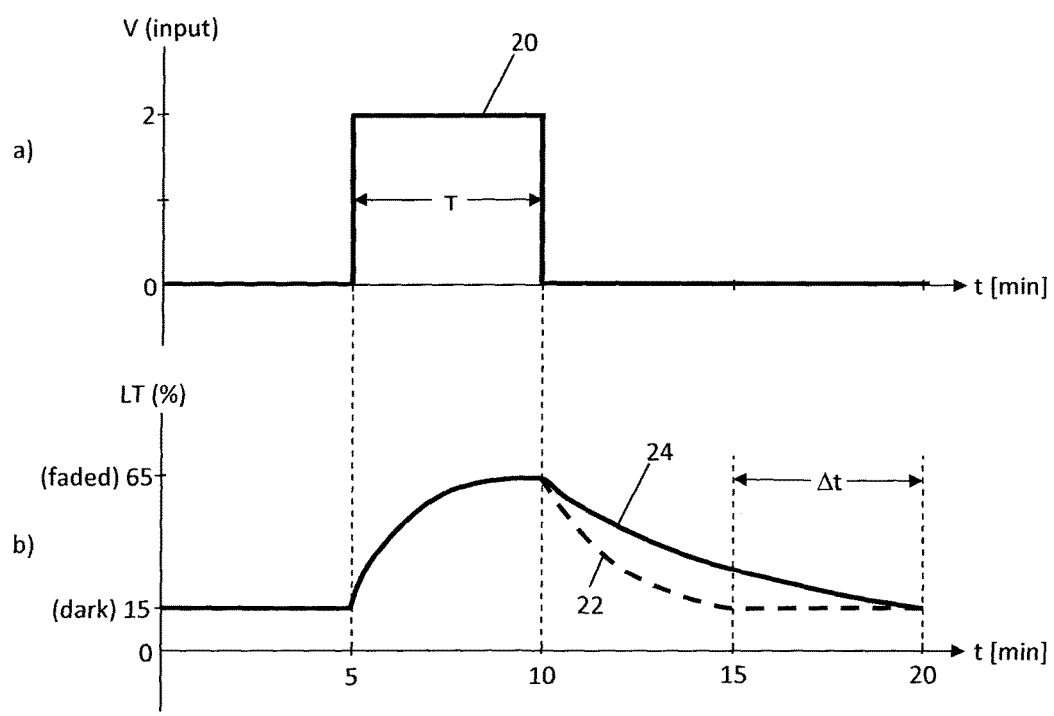
FIG. 2(a) illustrates a rectangular pulse voltage signal.
FIG. 2(b) illustrates the light transmittance of an optical filter assembly in response to the rectangular pulse voltage signal of FIG. 2(a) when the optical filter assembly's terminals are subsequently open circuited (solid line) and short circuited (dashed line), according to one embodiment.

FIGS. 2(a) and (b) are embodiments showing the difference between open circuiting the load terminals 45 and short circuiting the load terminals 45 when transitioning the assembly 46 to the dark state. FIG. 2(a) shows an input waveform comprising a rectangular pulse voltage signal 20 for initially biasing the assembly 46 to a faded state, while FIG. 2(b) shows the transmittance response of the assembly 46 to the rectangular pulse voltage signal 20, and when the assembly 46 is open and short circuited following the pulse voltage signal 20. In this example, there is sufficiently intense light shining on the assembly 46 to transition the assembly 46 to the dark state in the absence of an applied voltage. Accordingly, the assembly 46 is in the dark state from t=0 min to t=5 min. From t=5 min to t=10 min, when the voltage signal 20 is applied across the assembly 46's terminals, the assembly 46 transitions towards the fully faded state (which is about 65% light transmittance in this embodiment). At t=10 min the rectangular pulse voltage signal 20 ends. From t=10 min onwards, the solid line 24 illustrates the transmittance of the assembly 46 when the load terminals 45 of the switching circuitry 44 are open circuited, while a dashed line 22 illustrates the transmittance of the assembly 46 when the load terminals 45 of the switching circuitry 44 are short circuited. As shown by the solid line 24, when the load terminals 45 are open circuited, the transmittance gradually decreases until the dark state (about 15% light transmittance in this embodiment) is reached at about 20 min. However, as shown by the dashed line 22, when the load terminals 45 are shorted together, residual accumulated charge is more quickly dissipated allowing the assembly 46 to transition to the dark state faster. In this example the assembly 46 reaches the dark state at about 15 minutes when its terminals are shorted, and the required time for transitioning from the faded state to the dark state is reduced by about 5 minutes ($\Delta t$).

While FIGS. 2(a) and (b) illustrate the transmittance response of the assembly 46 according to a particular embodiment, the response may vary in other embodiments according to the switching material used and other extrinsic or physical factors. For example, a greater intensity of ambient light shining on the assembly 46 may require a higher amplitude voltage pulse in order to transition the assembly to the faded state. Also, the response of the assembly 46 may vary over its lifetime, or based on how often the assembly 46 is switched. For instance, built-up charge over successive cycles of the assembly may cause the darkening process (and transition times) to become slower and slower. In some embodiments, after a few cycles, it may become difficult or impossible to transition the assembly 46 to the dark state without shorting its terminals for a period of time to allow the electric charge in the assembly 46 to dissipate.

Further, while the assemblies 46 in the depicted embodiments comprise hybrid photochromic/electrochromic switching materials, the controller 48 may also short circuit load terminals 45 when coupled across assemblies 46 comprising other switching materials, such as SPD and electrochromics. In the case of SPD for example, a voltage may be applied to align the particles of the assembly 46 to thereby allow light to pass (faded state); when the voltage is removed, the particles assume a random pattern which scatters incident light (dark state). In this case, shorting the load terminals 45 can also help dissipate the charge accumulated on the electrodes to speed up the transition to the dark state.

In an example where the switching material is electrochromic, the assembly 46 is typically driven to its dark state by applying voltage of a first polarity across the terminals 45. It is driven back into a faded state by either applying a reverse polarity across the terminals 45, or simply removing voltage from the terminals 45 for a long period of time. Shorting the terminals 45 can help speed up the fading time of some electrochromic-based assemblies 46 by allowing accumulated charge on electrode terminals to quickly dissipate without having to apply a reverse voltage, which therefore also reduces power consumption.

Polarity Switching

Figure 17:
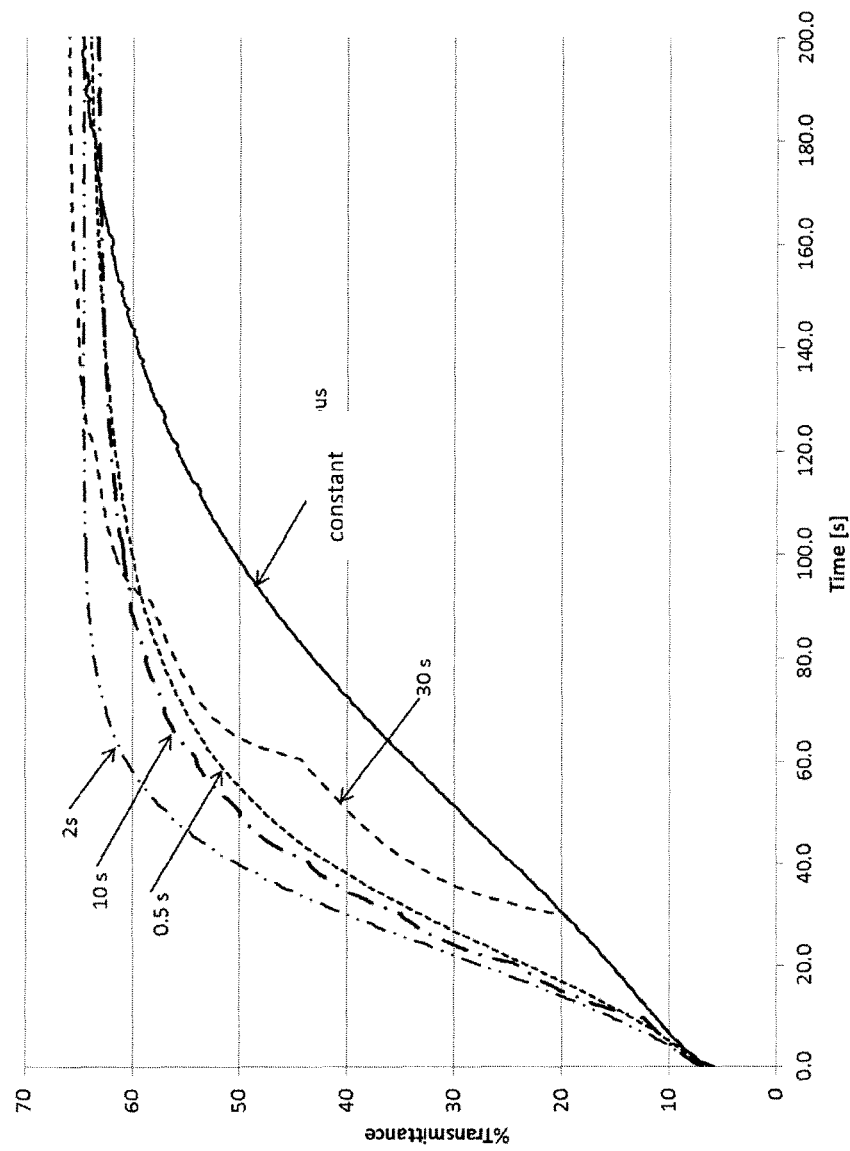
FIG. 17 is a plot illustrating light transmittance of an optical filter assembly in response to i) a constant voltage input, and voltage input signals with polarity reversal cycles of ii) 0.5 seconds, iii) 2 seconds, iv) 10 seconds, and v) 30 seconds, according to another embodiment.

In certain embodiments, the control system 40 may be used to switch or alternate polarity of the voltage applied across the assembly 46 one or more times when fading the assembly 46 (i.e. transitioning from dark to faded states). Polarity switching may help decrease the fading time required to transition from the dark state to the faded state. For example, FIG. 17 illustrates the assembly 46's transmittance response when a constant voltage is applied (no polarity switching), compared to when the polarity is switched at 0.5 s, 2 s, 10 s and 30 s switching intervals (i.e. voltage across the anode and cathode of the assembly is periodically reversed at each given interval). For a switching interval of duration x seconds, the applied voltage switches between positive and negative polarities every x seconds. In this example, the assembly 46 demonstrated a luminous transmittance ($LT_A$) of about 5-6% when in the dark state. When a continuous voltage was applied (no polarity switching), the transition time to fade to 60% $LT_A$ was about 140 s. When voltage was applied using polarity switching at 30 s, 10 s, or 0.5 s switching intervals, the transition time to achieve 60% $LT_A$ was reduced to about 100 s. Finally, when voltage was applied using polarity switching at a 2 s switching interval, the time to achieve 60% $LT_A$ was further reduced to about 50 s. Accordingly, it can be seen that in certain embodiments, the use of polarity switching can beneficially reduce the fading time of the assembly 46.

While the above embodiments depict nearly instantaneous polarity switching (e.g. the polarity was switched without applying an intermediate voltage across the assembly 46), other embodiments may comprise applying no voltage (open circuit), a short circuit, or a low intermediate voltage between polarity switches. For example, an open circuit may be applied for a short period of time (e.g., 0.1 to 5 seconds) across the assembly 46 between a transition from a forward voltage to a reverse voltage. This would have the effect of slowing the fading time, but potentially increases electrical durability of certain switching materials. In other embodiments, the duration between polarity switches is varied over the entire fading cycle. For example, the time period spent in an open circuit during polarity switching is shorter at the start of the fading cycle (e.g., 1 second) to enhance the initial change in light transmission, and then increases to a longer period (e.g., 3 seconds) by the end of the fading cycle.

Alternative Control System Embodiments

Figure 7:
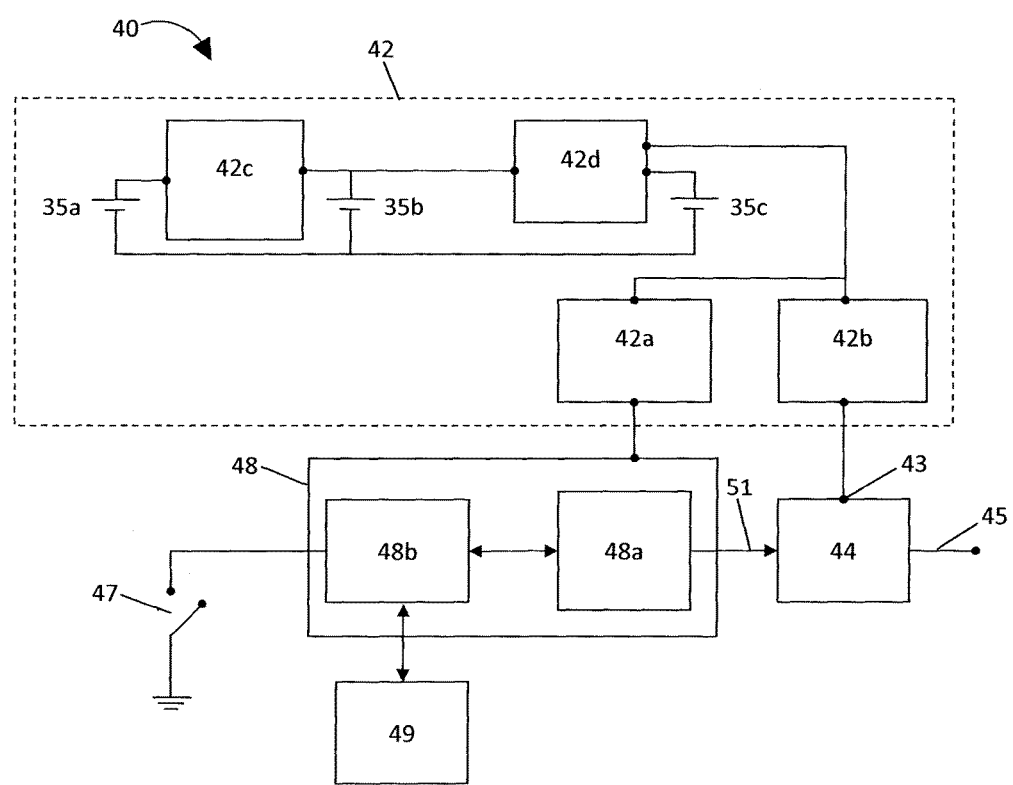
FIGS. 7 and 8 are block diagrams illustrating embodiments of non-feedback control systems.

Referring now to FIG. 7, there is shown an embodiment of the control system 40. As shown in FIG. 7, the power supply 42 comprises two DC power sources 35a and 35b, and a battery or other energy storage device 35c. The power supply 42 also comprises a battery charger 42d and voltage regulators (42a, 42b, 42c) in order to provide regulated power across the input voltage terminals 43 of the switching circuitry 44 and to the controller 48. The detector 47 in this embodiment is a switch, and the switching circuitry 44 is an H-Bridge which can apply voltage from the input voltage terminals 43 across the load terminals 45 in a forward or reverse polarity, or short or open circuit the load terminals 45. Power source 35a along with voltage regulator 42c allows the power supply 42 to be connected to multiple sources such as architectural 120 VAC, to automotive 12 VDC, and computer electronic 5 VDC. Depending on the size of the assembly 46 (not shown) that may be coupled to the load terminals 45, it may be possible to remove power source 35a and voltage regulator 42c, and power the control system 40 through only power source 35b, which could be a solar cell. This would allow the control system 40 and assembly 46 to operate without external wiring.

Figure 11:
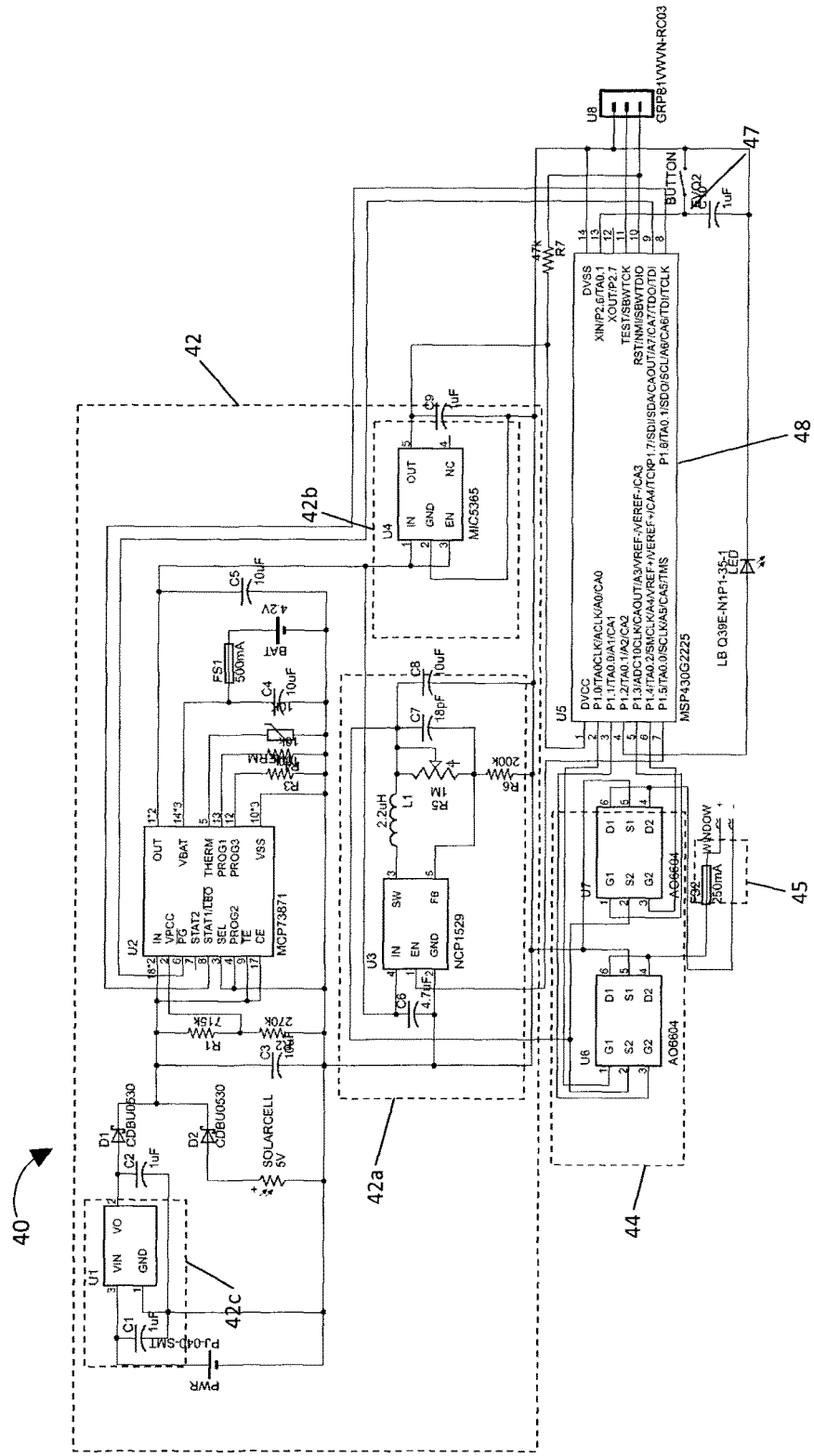
FIG. 11 is a circuit schematic of the non-feedback control system of FIG. 7o, according to an embodiment.

In other embodiments of the power supply 42 (not shown), power source 35a, and detector 47 need not be connected to ground (for example, see FIG. 11). Further, power sources 35a and 35b may be directly connected to voltage regulators 42a and 42b. If the voltage requirements for the switching circuitry 44 and the controller 48 are similar, regulators 42a and 42b may be replaced by a single voltage regulator to power the controller 48 and supply electricity to the assembly 46. In another embodiment (not shown), a third voltage regulator is positioned in parallel with regulator 42b and set to a higher voltage than 42b. The third voltage regulator may be initially turned on to quickly fade the assembly 46, with regulator 42b subsequently applied for holding the assembly 46 at a given transmittance thereafter. By employing a dual-voltage configuration, fading time may be reduced without necessarily sacrificing durability or longevity of the assembly 46.

FIG. 11 shows a circuit diagram of the control system 40 of FIG. 7, according to an embodiment. A charger implemented with a Microchip Technology™ MCP73871 microchip receives a power source, a voltage regulator 42a is implemented with an ON Semiconductor™ NCP1529 switching regulator to power the switching circuitry 44, and another voltage regulator 42b is implemented with a Micrel Inc.™ MIC5365 linear regulator circuit for powering the controller 48; these devices are electrically coupled together as shown in FIG. 11 to form the power supply 42. In other embodiments, voltage regulator 42a may be any voltage regulator that provides the desired input and output voltage ranges. For example, if a wider output range is desired, a Fremont Micro Devices™ FT441AA voltage regulator may be alternatively used to provide an output range of 0.6V-5.5V. The switching circuitry 44 in this embodiment comprises an H-bridge implemented by two electrically coupled Alpha and Omega Semiconductor™ AO6604 MOSFET circuits, while the controller 48 comprises a Texas Instruments™ MSP430G2252 microcontroller that incorporates a processor 48b, memory 49 and I/O module 48a into one unified package. An unused input pin labelled "12" on the controller 48 can be coupled to a detector 47 (not shown) for receiving the detector output signal 50, while the assembly 46 can be coupled to the load terminals 45 of the switching circuitry 44. In this embodiment, the power source feeding the power supply 42 may comprise a range of DC voltages; for example, the DC voltage can range from about 5 Volts (e.g., from a USB source) up to 12 Volts (e.g., from an automotive electrical system). However, other embodiments may accept voltages of different ranges. Additionally, in other embodiments, the power source can be a regulated power source such that any of the charger or voltage regulators 42a, 42b may accordingly be omitted from the power supply 42.

Figure 8:
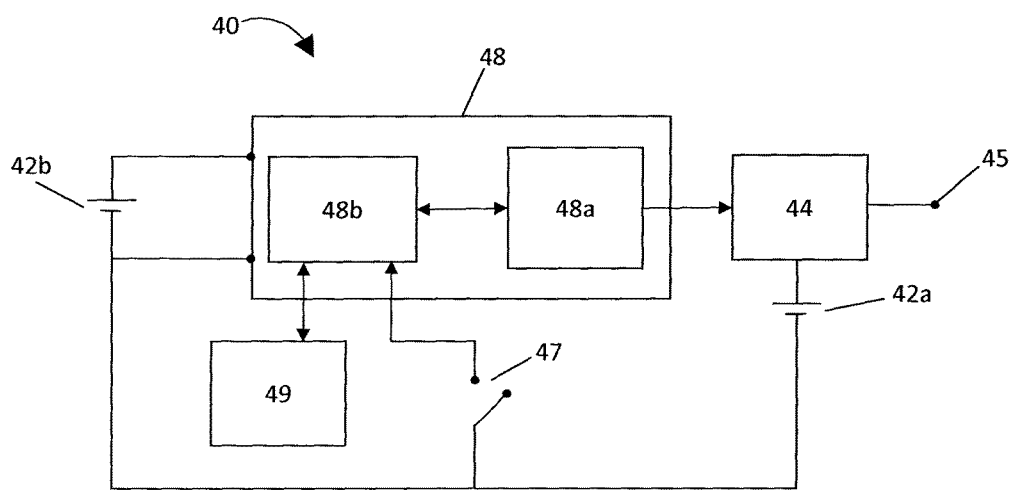

Referring now to FIG. 8, there is shown an embodiment of the control system 40 in which the switching circuitry 44 is an H-bridge, and the detector 47 is a switch. The power supply 42 comprises a pair of DC power sources 42a, 42b, each of which provides voltage to one of the H-bridge and the controller 48. The H-bridge switching circuitry 44 allows voltage to be applied across the load terminals 45 in forward or reverse polarity, and also allows the load terminals 45 to be open or short circuited according to the desired control of the assembly 46. In other embodiments, if the threshold voltage of the assembly 46 is comparable to the operating voltage of the controller 48, then DC power sources 42*a* and 42*b* may be replaced by a single voltage regulator.

Figure 9:
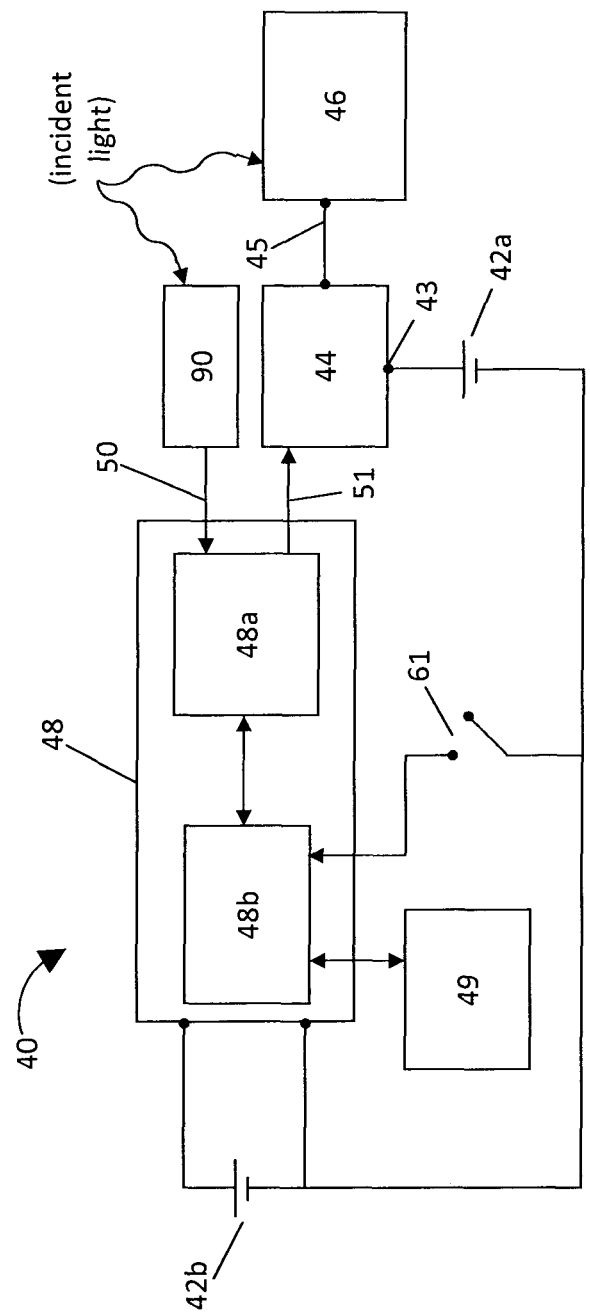
FIG. 9 is a block diagram illustrating an embodiment of an adaptive control system.

Referring now to FIG. 9, there is shown an embodiment of the control system 40 that is somewhat similar to the control system 40 of FIG. 8. However, the embodiment differs in that the control system 40 of FIG. 9 is setup for adaptive control of the assembly 46 based on incident light levels shining on the assembly 46, or light transmitted through the assembly 46. In this configuration the detector comprises a combination of a light detector 90 and a switch 61. The adaptive configuration of the control system 40 advantageously allows the controller 48 to more precisely control the assembly 46 in view of ambient lighting conditions using the light detector output signal 50. For example, by suitably programming instructions on the memory 49, the controller 48 is configured to automatically control the switching circuitry 44 to short circuit or open circuit the load terminals 45 if the light detector 90 indicates that ambient light exceeds a certain threshold (e.g. the environment is too bright), or otherwise have the switching circuitry 44 apply a voltage across the load terminals 45 if the ambient light does not exceed the threshold (e.g. the environment is too dark). The switch 61 may be used by a user to indicate to the controller 48 whether a faded state is desired, in which case a voltage is applied across the load terminals 45, or whether a dark state is desired, in which case the terminals 45 are shorted together or open circuited. In alternative embodiments, the switch 61 may perform other functions (e.g.: instruct the processor 48 to disregard the detector output signal 50 and instead transition between the light and dark states based solely on an internal timer or a look-up table). Further, when applying voltage across the load terminals 45, the switching circuitry 44 can apply a forward or reverse voltage. Applying a reverse voltage to the assembly 46, as discussed above and shown in FIG. 17, may also improve the transitional times between different states, or improve the longevity of the assembly 46. This because a reverse voltage can potentially prevent a buildup of deposits from accruing onto a single electrode that would otherwise occur from applying only a forward voltage.

Figure 10:
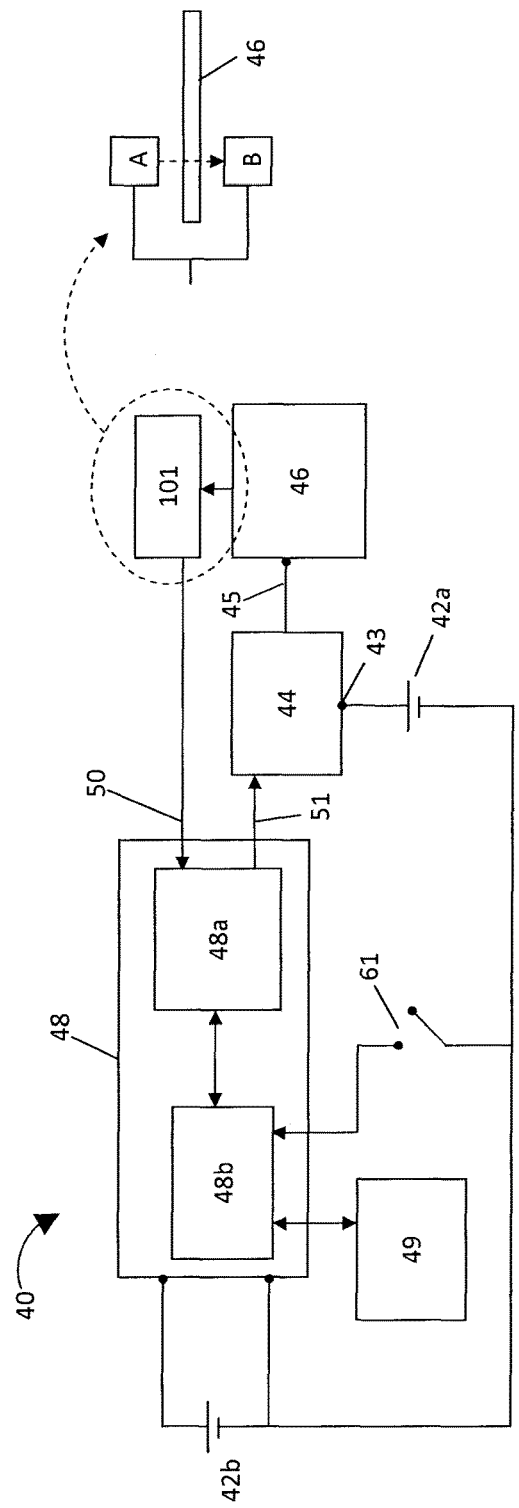
FIG. 10 is a block diagram illustrating an embodiment of a closed-loop control system.

FIG. 10 shows an embodiment of a control system 40 similar to the control system 40 shown in FIG. 9, but instead setup in a closed-loop configuration instead of an adaptive configuration. Closed-loop configuration allows for direct measurement of the transmittance of the assembly 46, as opposed to an adaptive configuration which provides an inference or estimation of the assembly 46's transmittance. In this way, the closed-loop configuration more accurately controls and adjusts transmission of light through the assembly 46. By detecting when the assembly 46 has transitioned into a faded, dark, or desired intermediate state, the control system 40 can promptly remove or apply voltage to the assembly 46 in order to maintain the desired transmittance while reducing power consumption.

As shown in FIG. 10, the detector 47 comprises a light transmission meter 101 that detects the actual transmittance of the assembly 46. The light transmission meter 101 may comprise a lighting element A, and a light detector B that measures the light transmitted through the assembly 46 by lighting element A. The detector output signal 50 thus comprises a differential measurement that is sent from the light transmission meter 101 to the controller 48. In this way, and as discussed below in further detail, the processor 48*b* through the I/O module 48*a* can control the switching circuitry 44 based on the actual transmittance (or state) of the assembly 46. In another embodiment (not shown), the light transmission meter 101 comprises two light detectors on opposite sides of the assembly 46. Incident ambient light shone on the assembly 46 is received by both detectors, and a differential measurement is provided based on the amount of incident light that passes through the assembly 46 compared to the total incident light. In this way, the transmittance of the assembly 46 can be adjusted according to the ambient lighting conditions surrounding the assembly 46.

"Hold Mode" Operation Using Pulse Width Modulation

Because of the capacitive behaviour of the assembly 46, a pulse width modulated signal may be applied across the assembly 46's terminals to hold its transmittance at a certain average value and variance, corresponding to an operative state between the fully faded and dark states. The pulse width modulated signal may comprise a plurality of voltage pulses, with the amplitude, width, and polarity of each pulse adjusted to achieve or maintain a desired operative state. Pulse width modulation also reduces the assembly 46's total exposure to electricity over a given period, which may prevent degradation in the switching material and increase its longevity. Finally, pulse width modulation also reduces power consumption when compared to maintaining a particular operative state by applying a constant voltage.

Figure 3:
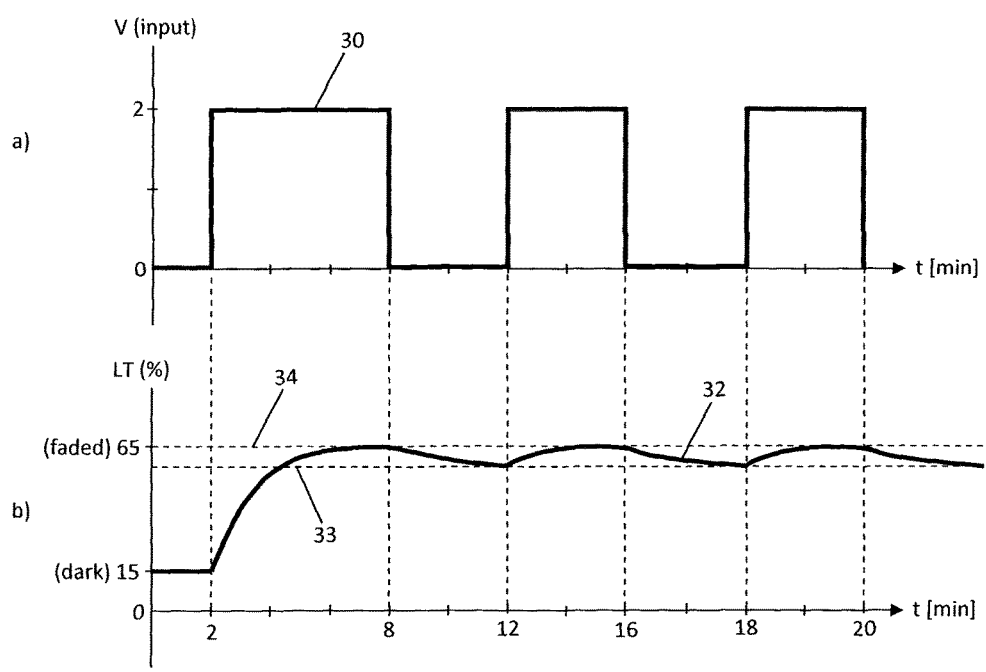
FIG. 3(a) shows a pulse wave modulated signal used to place the optical filter assembly into a hold mode.
FIG. 3(b) illustrates the optical filter assembly's transmittance when in the hold mode, according to another embodiment.

FIG. 3(*b*) illustrates the transmittance of an assembly 46 in response to the voltage pulse train 30 of FIG. 3(*a*), according to an embodiment. In FIG. 3(*b*), the faded state of the assembly 46 is defined as a range of transmittances between a lower transmittance threshold 33 (e.g. a first threshold) and an upper transmittance threshold 34 (e.g. a second threshold), which is selected such that a user will not perceive any significant difference in transmittance within this range. As shown in FIG. 3(*a*) the pulse train 30 is applied to the assembly 46 that is initially in the dark state. In this example, at t=2 minutes, the pulse train 30 switches from 0 V to 2 V, and the transmittance 32 correspondingly increases until reaching the upper transmittance threshold 34 at t=8 minutes. From t=8 to t=12 minutes, the pulse train 30 is switched to 0 V, and thus the transmittance 32 gradually decreases during this period until it reaches the lower transmittance threshold 33 at t=12 minutes. The pulse train 30 is then switched back to 2 V at t=12 minutes, and the transmittance 32 correspondingly increases until it reaches the upper transmittance threshold 34 at t=16 minutes. This pattern then repeats for the remainder of the time on the graph. It can therefore be seen that from t=8 minutes and onwards, the controller 48 maintains the assembly 46 in a "hold mode" where its transmittance is held at an average value (between the upper 34 and lower 33 thresholds) and a non-zero variance corresponding to the faded state. In other embodiments however, the controller 48 can maintain the assembly 46 in a "hold mode" where its transmittance is held at an average value and variance corresponding to an intermediate state (i.e. between the fully faded and dark operative states). Given a sufficient variance, "hold mode" operation reduces power consumption and may extend life of the assembly 46, while to the user it appears that the assembly 46 is being held at a certain transmittance corresponding to a desired operative state. In other embodiments, the controller 48 can produce voltage pulse trains of different periodicities, duty cycles, and amplitudes, and can also apply non-square wave signals such as sinusoids and the like. The duty cycle of the pulse train 30 may be chosen according to the desired response of the switching material. In this way, the assembly 46's transmittance can be maintained within a desired operative state, while reducing power consumption and preventing degradation of the assembly 46.

In another embodiment (not shown), an additional voltage regulator may be incorporated into the system 40 to supply different voltage levels when pulses of different amplitudes are desired. For example, the initial pulses of the pulse train may comprise a first, relatively higher, voltage level (e.g., 2V) for transitioning the assembly 46 from the dark state to the light state, and subsequent pulses may be set to a second, relatively lower, voltage level (e.g., 1.5V) to thereafter maintain the assembly 46 in a desired faded state.

Figure 5A:
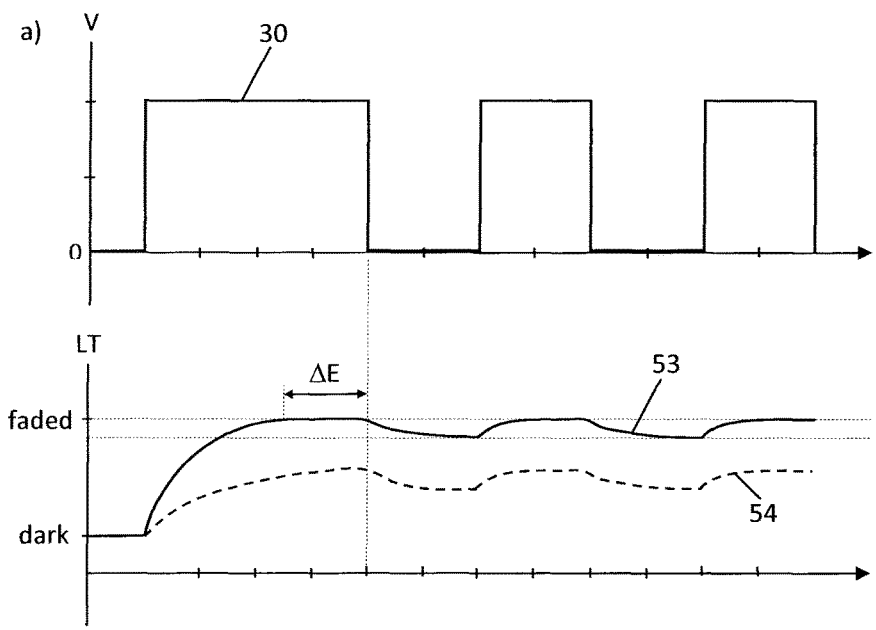
FIGS. 5(a) to (c) and 6(a) to (c) illustrate the optical filter assembly's transmittance response when controlled by non-feedback (FIGS. 5(a) and 6(a)), adaptive (FIGS. 5(b) and 6(b)), and closed-loop (5(c) and 6(c)) control systems, according to additional embodiments.
Figure 5B:
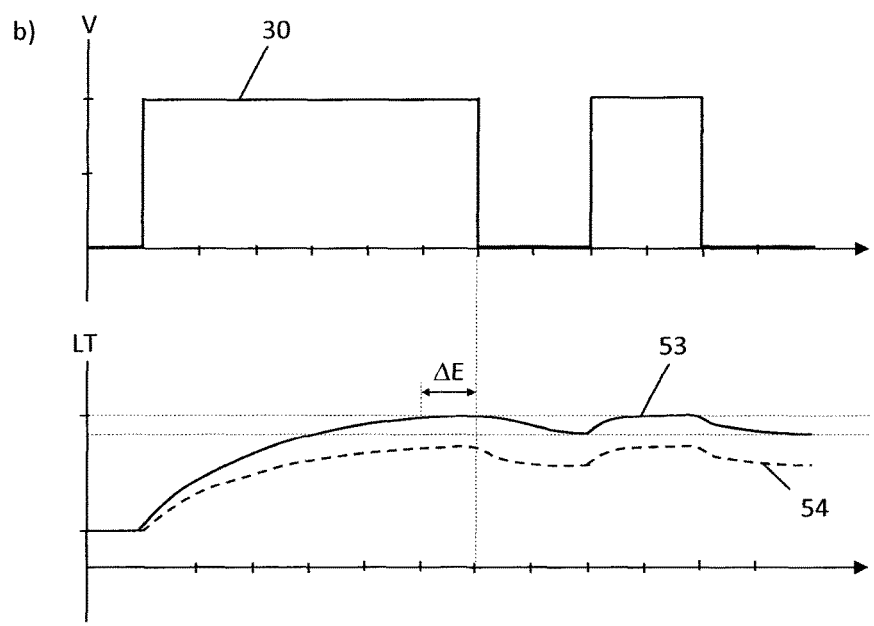
Figure 5C:
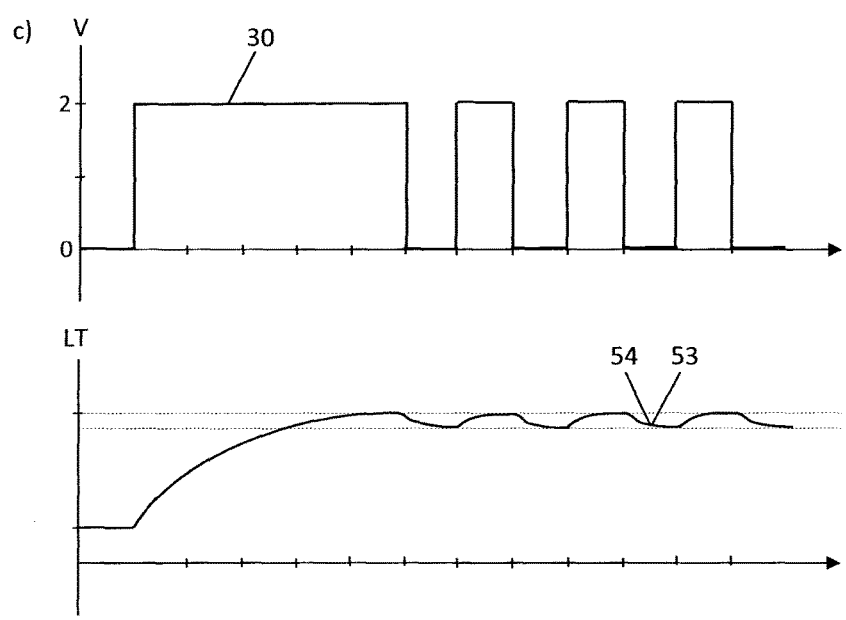
Figure 6A:
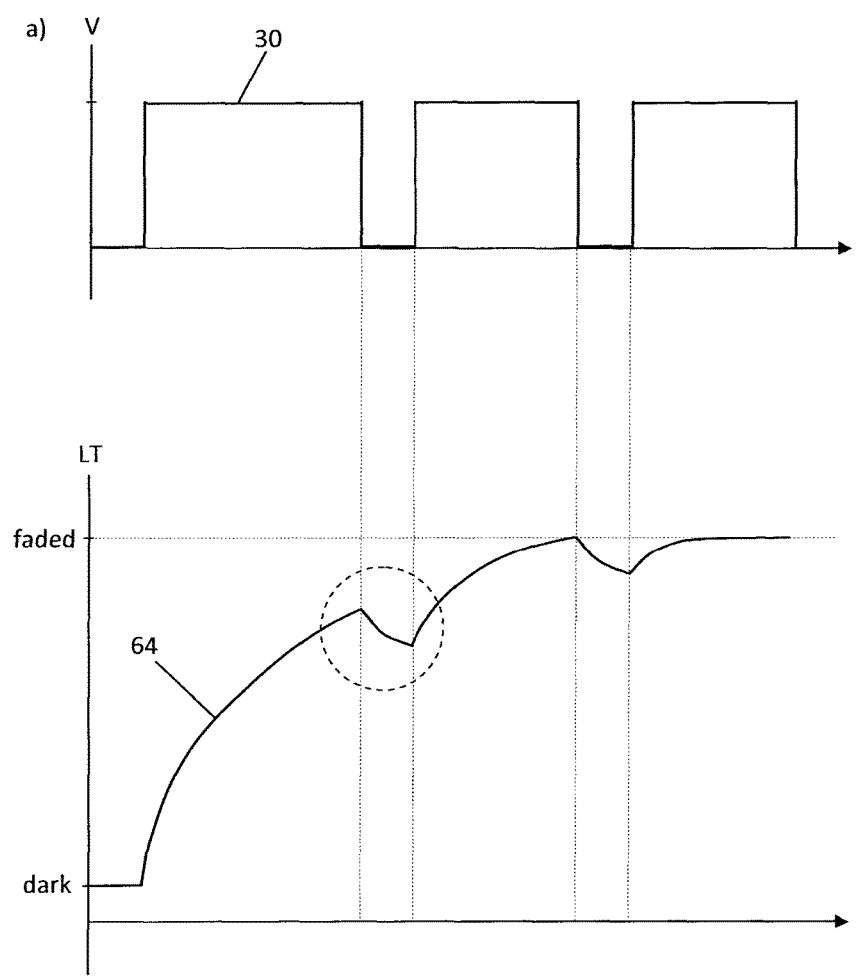

FIGS. 5 and 6 are graphs illustrating each of the control systems 40 of FIGS. 8, 9, and 10 operating in a "hold mode" by applying a pulse width modulated signal to hold the assembly 46's transmittance at a certain average value and variance corresponding to a desired operative state. Specifically, FIGS. 5(*a*) and 6(*a*) illustrate hold mode operation using the "non-feedback" (or open-loop) configuration control system 40 of FIG. 8 without any incident light detector 90 or light transmission meter 101. FIG. 5(*b*) illustrates hold mode operation using the adaptive configuration control system 40 of FIG. 9, which includes an incident light detector 90. FIGS. 5(*c*), and 6(*c*) illustrate hold mode operation using the closed-loop configuration control system 40 of FIG. 10, which includes a light transmission meter 101. Further details of the hold mode operation under each of these configurations are provided below.

Non-Feedback Configuration

FIG. 5(*a*) is a graph illustrating the expected and actual transmittance response 53, 54 of the assembly 46 when applying a predetermined pulse train 30 using the non-feedback configuration of FIG. 8. In this example, the first pulse of the pulse train 30 is wider than successive pulses in order to bias assembly 46 to the average transmittance (and thus ensure that it reaches the faded state) before periodically pulsing the assembly 46. Once the assembly 46's has reached the average transmittance, the controller 48 applies successive pulses, as described above for FIG. 3(*b*), to hold the assembly 46 at the average transmittance and a variance which corresponds to the desired operative state. The non-feedback configuration control system 40 of FIG. 8 may be used to provide a simple, reliable, and effective solution with reduced component and assembly costs, as it precludes implementation and initialization/calibration of any light sensors or transmission meters.

However, while cheaper and more straightforward to implement, the non-feedback configuration may not account for unexpected changes in the response characteristics of the assembly 46. For example, changes to the ambient lighting conditions, or changes in the performance of the assembly 46's switching material over its lifetime, may vary its response characteristics to the pulse train 30; this is shown, for example, by the actual transmittance response 54 drawn in the dashed line. As shown, the biasing period (i.e. the first pulse width) which was previously sufficient to bias the assembly 46 to the average transmittance corresponding to the faded state (as shown by 53), now insufficiently biases the assembly 46 (as shown in 54) due to unexpected changes. Accordingly, the non-feedback configuration control system 40 may fail to hold the assembly 46 at a certain average transmittance and variance corresponding to a desired operating state, when unexpected changes affect the assembly 46.

Similarly, FIG. 6(*a*) is another embodiment illustrating transmittance response characteristics of the assembly 46 when applying the pulse train 30 using a non-feedback configuration control system 40. As with FIG. 5(*a*), the first pulse of the pulse train 30 comprises a predetermined width normally sufficient to bias the assembly 46's transmittance to the average value corresponding to the faded state, before periodic pulsing is applied by the controller 48 to hold the assembly 46 in the faded state. However, if there is an unexpected environmental change, such as an increase in the intensity of ambient light shining on the assembly 46, the first pulse of the pulse train 30 may insufficiently bias the assembly 46 such that the assembly 46's transmittance does not reach the average value to enter the faded state. Accordingly, the lack of any feedback relating to the actual transmittance of the assembly 46 may prevent the controller 48 from adequately biasing the assembly 46, and from properly holding the assembly 46's transmittance at a desired operating state.

Adaptive and Closed-Loop Configurations

As described above, an increase in the expected intensity of light shining on the assembly 46 may prevent the controller 48 from adequately biasing the assembly 46's transmittance and prevent it from transitioning to the faded state. This is because light tends to automatically darken the assembly 46, which counteracts the application of voltage by the controller 48 to fade the assembly 46. To overcome this problem, the adaptive configuration control system 40 includes an incident light sensor 90 to measure ambient lighting conditions, and in turn adjust the pulse width modulated signal applied to the assembly 46 in order to adequately bias the assembly 46 and maintain its transmittance within the desired operative state. For example, when the controller 48 receives a luminosity reading from the incident light sensor 90, it may then compare this reading to a look-up table in the memory 49. The loop-up table will provide a suitable pulse width modulated signal to more closely achieve the desired operating state of the assembly 46, in view of the measured luminosity reading. Accordingly, the biasing times, voltage levels, duty cycles, and periodicities of each pulse width modulated signal in the look-up table can be specifically modeled to achieve a desired operative state for the assembly 46 for given ambient lighting conditions. The controller 48 can then use this information to adjust the pulse train 30, to more closely achieve the desired operating state for the assembly 46.

As shown in FIG. 5(*b*), the biasing time of the first pulse in pulse train 30 has been lengthened by 2 units, compared to the non-feedback configuration in FIG. 5(*a*), in order to compensate for the increased ambient light inhibiting the assembly 46's ability to fade. As shown in FIG. 5(*b*), that the actual and expected transmittance responses 54, 53 are more closely mapped to each other than those of FIG. 5(*a*). Accordingly, the adaptive configuration control system 40 of FIG. 9 may be used to more closely achieve the desired operating state for the assembly 46.

FIG. 5(*c*) illustrates the assembly 46's transmittance when controlled in the closed-loop configuration control system 40 of FIG. 9. In contrast to the non-feedback and adaptive configurations, the closed-loop configuration system 40 directly measures the assembly 46's transmittance to account for unexpected changes affecting its performance, and accordingly modifies the pulse train 30 in real-time to more accurately bias and maintain the assembly 46 in the desired operative state. This is reflected in FIG. 5(*c*), as the actual and expected transmittance responses 54, 53 substantially overlap when using the closed-loop configuration control system 40. Further, the closed-loop configuration can immediately maintain the assembly 46 at the desired faded state upon biasing. This reduces power consumption by preventing unnecessary application of voltage, as shown for example by time intervals ΔE in FIGS. 5(a) and 5(b), illustrating the excessive marginal biasing times when using the non-feedback and adaptive control systems 40, respectively.

Figure 6B:
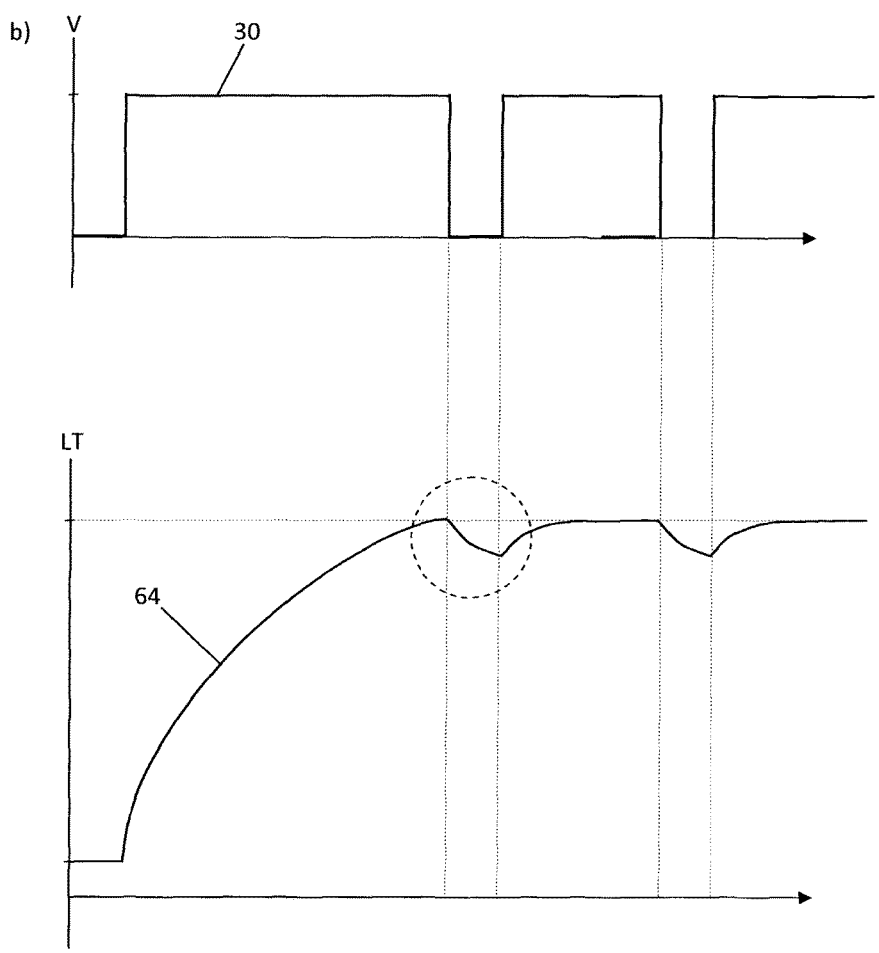

FIG. 6(b) is another example illustrating the transmittance response 64 of the assembly 46 to pulse train 30, when controlled by the closed-loop configuration control system 40. By directly measuring the assembly 46's transmittance in real-time, the closed-loop control system 40 can accordingly adjust the pulse width modulated signal (e.g. pulse train 30) applied to the assembly 46, and in turn accurately maintain its transmittance at an average value and variance corresponding to desired operative state. As shown in FIG. 6(b), the first pulse of pulse train 30 has a sufficient width to properly bias the assembly 46 to enter the faded state, before periodic pulsing is applied to maintain it within the faded state.

Figure 6C:
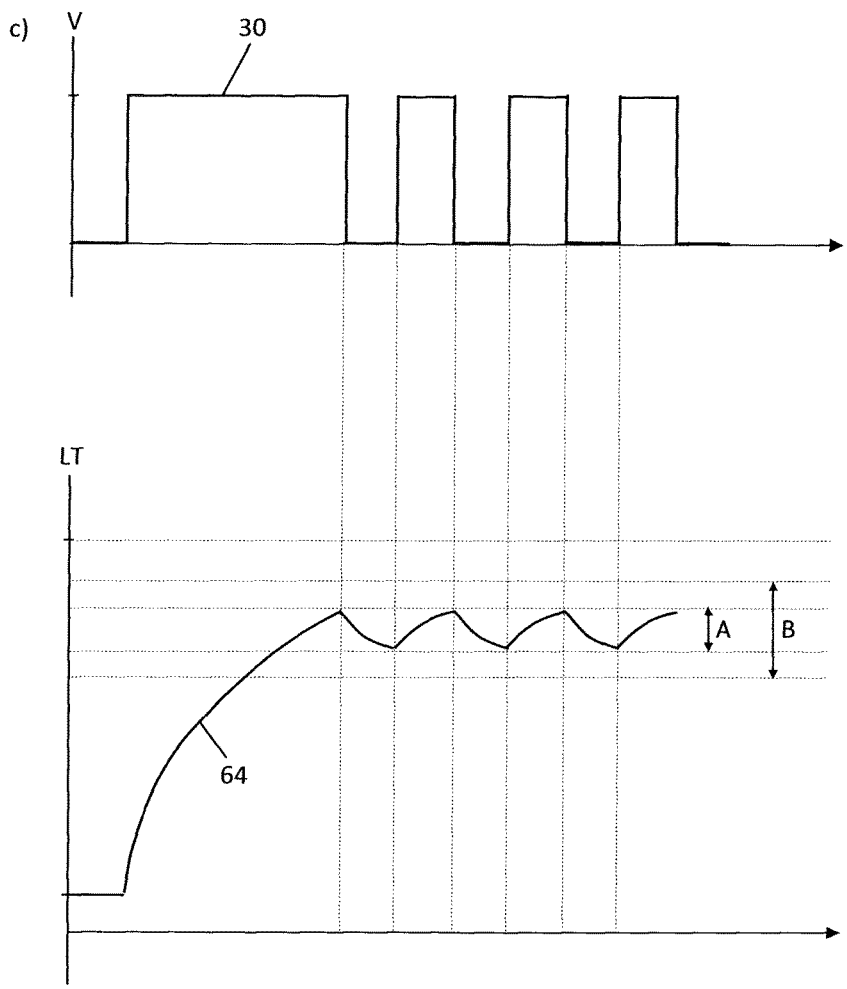

FIG. 6(c) is an example illustrating the variance when using a hold mode in the closed-loop and adaptive configurations to maintain the assembly 46 at a certain average transmittance. Range A represents the total variance about the average transmittance using the closed-loop configuration of FIG. 10, while range B represents the variance using the adaptive configuration of FIG. 9. As shown in this example, the closed-loop control system 40 has a reduced variance about the desired average transmittance, resulting in greater precision and control of the assembly 46's transmittance.

In other embodiments (not shown), the closed-loop configuration control system 40 can comprise both a light transmission meter 101 and an incident light detector 90. By additionally utilizing sensory input of the incident light detector 90, the controller 48 may monitor incoming light emitted onto the assembly 46 in order to selectively control the assembly 46 based on the incident light, or potentially control the emission of ambient light (e.g. through blinds or building light) to provide energy savings. Window and timing variables may be characterized when using an adaptive configuration, but are not necessary for a closed-loop configuration.

Optical Filtering System

Referring to FIGS. 12 to 16, there are shown embodiments of an optical filtering system 120 comprising various types of switching circuitry 44 in contrast to H-Bridges as described above. As shown in FIGS. 12 to 16, the optical filtering system 120 includes switching circuitry 44 having a pair of input voltage terminals 43 and a pair of load terminals 45, and the optical filter assembly 46 is coupled across the load terminals 45. A power supply 42 is coupled to the input voltage terminals 43 to provide an input voltage.

Figure 12:
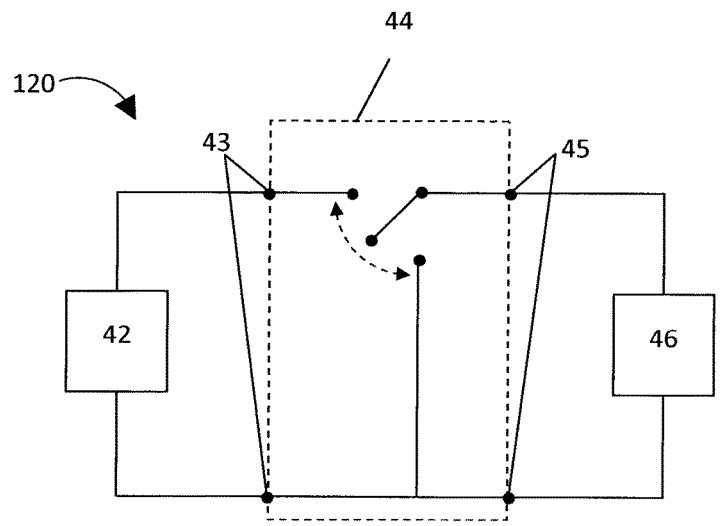
FIG. 12 is a block diagram of an optical filtering system comprising switching circuitry in the form of a single pole, double throw (SPDT) switch, according to another embodiment.
Figure 13:
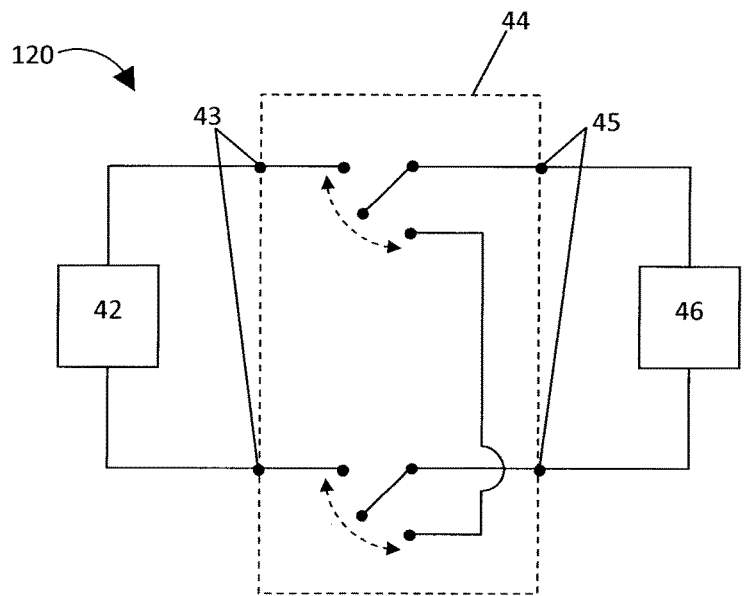
FIG. 13 is a block diagram of the optical filtering system comprising switching circuitry in the form of a double pole, double throw (DPDT) switch, according to another embodiment.
Figure 14:
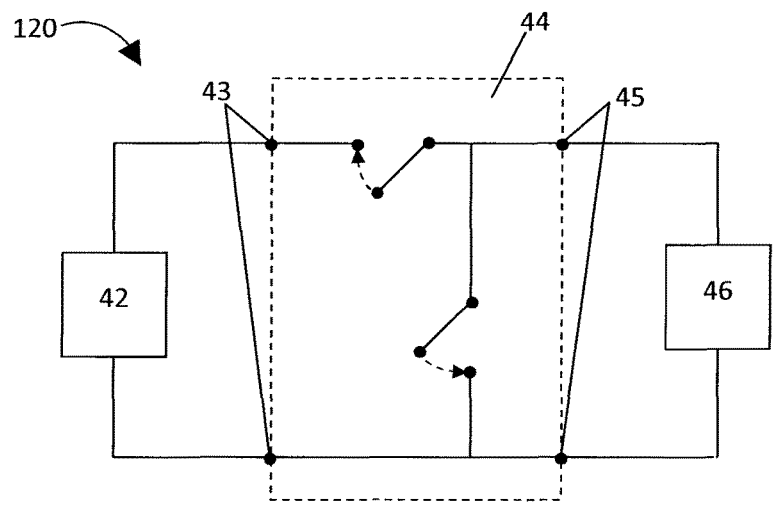
FIG. 14 is a block diagram of the optical filtering system comprising switching circuitry in the form of single pole, single throw (SPST) switches, according to another embodiment.
Figure 15:
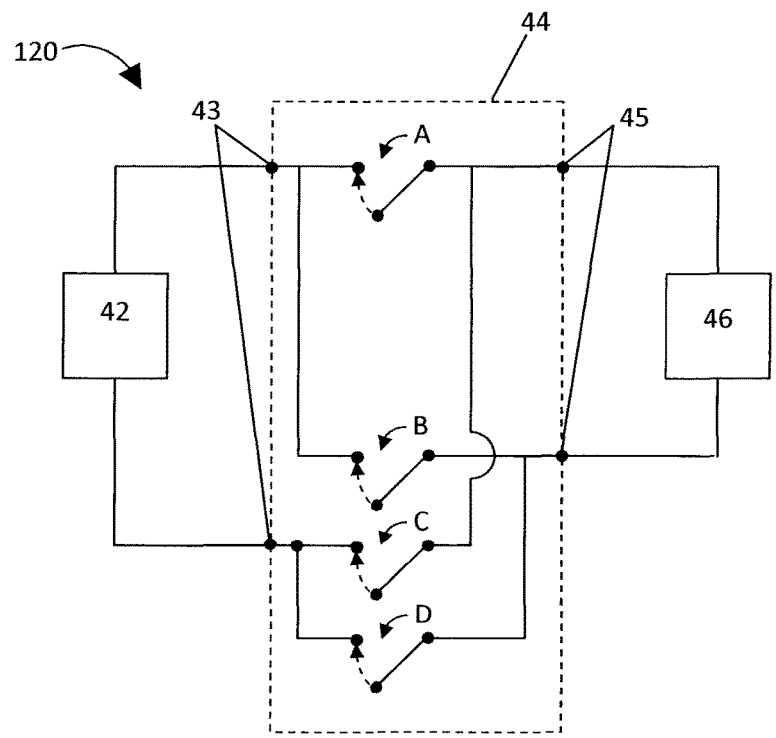
FIG. 15 is a block diagram of the optical filtering system comprising switching circuitry in the form of an H-bridge, according to another embodiment.

Referring to the embodiment of FIG. 12, the switching circuitry 44 comprises a single pole, double throw (SPDT) switch coupled between the input voltage terminals 43 and the load terminals 45 in order to switch between the faded and dark states. The SPDT switch may be manually controlled. However, switching circuitry 44 may comprise other types of switches in other embodiments, and for example, may comprise a double pole, double throw (DPDT) switch (FIG. 13), multiple single pole, single throw switches (FIG. 14), or an H-bridge (FIG. 15). These various types of switches may be manually controlled. The system 120 of FIG. 12 is able to short the assembly 46 terminals together and to a common terminal of the power supply 42; the system 120 of FIG. 13 is able to short the assembly 46 terminals to each other independently of the power supply 42; the system 120 of FIG. 14 is able to short the assembly 46 terminals to a common terminal of the power supply 42 while independently controlling whether to apply any of the input voltage across the assembly 46; and the system 120 of FIG. 15 allows for forward voltage, reverse voltage, open circuit, or short circuit configuration of the assembly 46 terminals.

Figure 16:
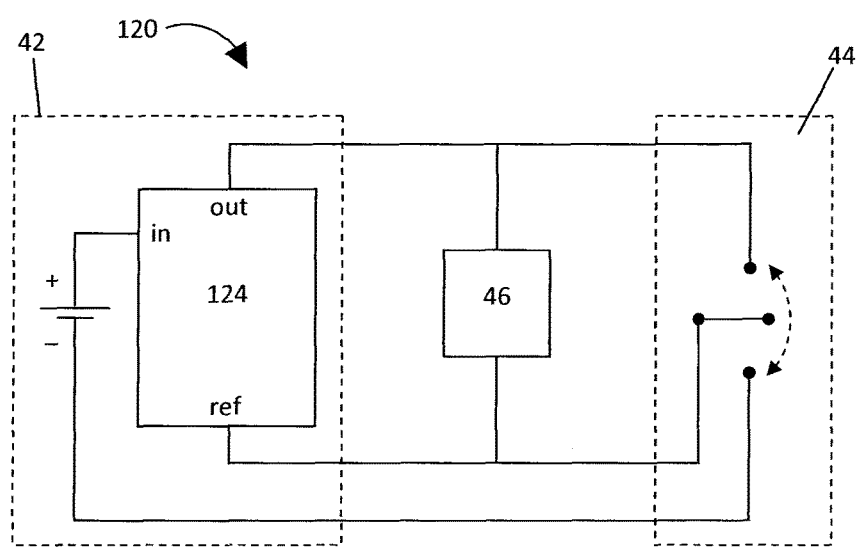
FIG. 16 is a block diagram of the optical filtering comprising switching circuitry coupled to a voltage regulator, according to another embodiment.

Referring to FIG. 16 is an embodiment where the power supply 42 comprises a voltage regulator 124 coupled to an AC or DC power source, and the input voltage terminals 43 and the load terminals of the switching circuitry 44 share a common electrode terminal coupled to a reference output of the voltage regulator 124.

The optical filtering system 120 may also be configured to provide a pulse train as the portion of the input voltage applied across the pair of load terminals 45 through operation of the switching circuitry 44. In alternative embodiments, the optical filtering system 120 may be used in adaptive and closed-loop configurations, analogous to the systems 40 described above. Similarly, in further alternative embodiments, the period, duty cycle, and amplitude of the pulse train or input voltage applied to the load terminal 45 can be adjusted in accordance with readings from a detector 47, switch 61, or any other sensory input.

In the foregoing embodiments, the controller 48 is communicatively coupled to the assembly 46 via the switching circuitry 44. However, in alternative embodiments (not depicted), the controller 48 may be directly coupled to the assembly 46 without the switching circuitry 44, where the controller's 48 output pins may act as the load terminals 45 for the assembly 46. In these embodiments, the controller 48 can adjust the voltage levels on its output pins to drive the assembly 46 into the faded state, to open circuit or short the terminals of the assembly 46 together to facilitate transition to the dark state, to maintain the assembly 46 in a hold mode, to apply a voltage signal of alternating polarity to drive the assembly to a faded state, and to otherwise control the assembly 46 as desired. As used in this disclosure, the terms "coupled" and "in communication" refer to a relationship between two elements such that they are communicatively coupled.

For the sake of convenience, the exemplary embodiments above are described as various interconnected functional blocks or distinct software modules. This is not necessary, however, and there may be cases where these functional blocks or modules are equivalently aggregated into a single logic device, program or operation with unclear boundaries. In any event, the functional blocks or software modules can be implemented by themselves, or in combination with other operations in either hardware or software.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible. The description should be understood as illustrative of the invention, but should not be considered as limiting on the claims appended hereto. The scope of the claims should be interpreted having regard to the spirit of the invention and given the broadest possible interpretation consistent with the description as a whole.

The invention claimed is:

1. A control system for a variable transmittance optical filter assembly, the optical filter assembly comprising a pair of terminals and an optical filter electrically coupled between the pair of terminals, the control system comprising:
   (a) a controller communicatively coupled to a pair of load terminals for electrically coupling to the terminals of the optical filter assembly;
   (b) a memory communicatively coupled to the controller and having encoded thereon statements and instructions executable by the controller to transition the optical filter assembly between first and second operating states, wherein the controller allows the optical filter assembly to transition from the second operating state to the first operating state by shorting the load terminals together, wherein, when transitioning from the second operating state to the first operating state in response to light striking the optical filter, a transmittance of the optical filter assembly decreases to a minimum transmittance, and wherein, when transitioning from the first operating state to the second operating state in response to a voltage being applied across the terminals of the optical filter assembly, the transmittance of the optical filter assembly increases to a maximum transmittance;
   (c) switching circuitry communicatively coupled between the controller and the pair of load terminals, the switching circuitry configured to short the load terminals together in response to a control input signal received from the controller, wherein the switching circuitry is switchable to apply at least a portion of an input voltage across the load terminals in one polarity and an opposite polarity; and
   (d) a detector communicatively coupled to the controller, and wherein the statements and instructions encoded on the memory are further executable by the controller, upon receiving a detector output signal from the detector, to cause the switching circuitry to short the load terminals together so as to dissipate residual charge accumulated on the load terminals and thereby facilitate the optical filter assembly transitioning from the second operating state to the first operating state, during which the transmittance of the optical filter assembly decreases to the minimum transmittance.

2. The control system of claim 1 wherein the detector comprises at least one of a switch, a clock, a timer, an HVAC system, a building control system, and an automotive control system.

3. The control system of claim 1, wherein the statements and instructions encoded on the memory are further executable by the controller to perform a method comprising: comparing the detector output signal to a threshold; and when the detector output signal meets the threshold, shorting the load terminals together.

4. The control system of claim 3 wherein the detector is a light sensor, the detector output signal is a luminosity value, and the threshold is a maximum luminosity threshold.

5. The control system of claim 1, wherein the switching circuitry comprises at least one of an H-bridge, a single pole double throw switch, and a double pole double throw switch.

6. The control system of claim 1, further comprising a voltage regulator coupled between the pair of terminals for receiving voltage from a power supply, and providing a regulated voltage as the input voltage received by the switching circuitry.

7. The control system of claim 1, wherein the first operating state is a dark state.

8. The control system of claim 1, further comprising the optical filter assembly coupled between the pair of load terminals, wherein the optical filter is a hybrid photochromic/electrochromic optical filter.

9. The control system of claim 1 wherein the statements and instructions encoded on the memory are executable by the controller to, in response to the detector output signal, send the control signal to the switching circuitry to perform any one or more of: apply the portion of the input voltage signal across the load terminals in one polarity; apply the portion of the input voltage across the load terminals in a reverse polarity.

10. A method for controlling a variable transmittance optical filter assembly comprising a pair of terminals and an optical filter electrically coupled between the terminals, the method comprising:
   (a) applying a voltage across the terminals of the optical filter assembly sufficient to transition the optical filter assembly from a dark state to a faded state, wherein the voltage is applied in one polarity and in an opposite polarity; and
   (b) in response to receiving a detector output signal from a detector, shorting the terminals of the optical filter assembly together so as to dissipate residual charge accumulated on the load terminals and to allow the optical filter assembly to transition from the faded state to the dark state, wherein, when transitioning from the faded state to the dark state in response to light striking the optical filter, a transmittance of the optical filter assembly decreases to a minimum transmittance, and wherein, when transitioning from the dark state to the faded state in response to a voltage being applied across the terminals of the optical filter assembly, the transmittance of the optical filter assembly increases to a maximum transmittance.

* * * * *